W. G. LATIMER.
APPARATUS FOR HYDRAULICALLY STORING AND DELIVERING HYDROCARBON OILS.
APPLICATION FILED JAN. 19, 1912.
1,065,452.
Patented June 24, 1913.
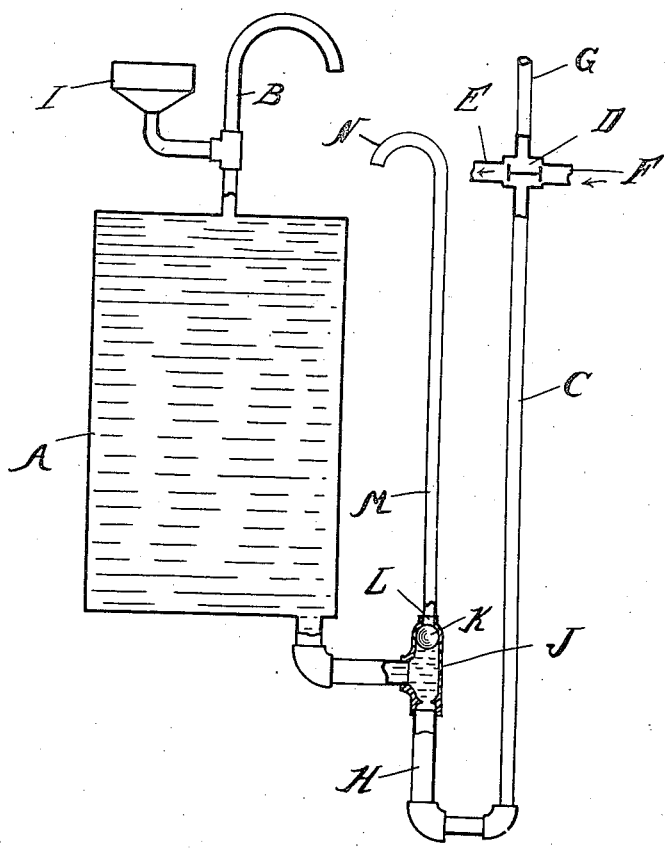
Witnesses
W. K. Fad
C. B. Belknap
Inventor
William G. Latimer.
By Whittemore, Hulbert & Whittemore
attys

UNITED STATES PATENT OFFICE.

WILLIAM G. LATIMER, OF DETROIT, MICHIGAN, ASSIGNOR TO E. B. CADWELL & COMPANY, OF DETROIT, MICHIGAN, A COPARTNERSHIP.

APPARATUS FOR HYDRAULICALLY STORING AND DELIVERING HYDROCARBON OILS.

1,065,452. Specification of Letters Patent. Patented June 24, 1913.

Application filed January 19, 1912. Serial No. 672,182.

*To all whom it may concern:*

Be it known that I, WILLIAM G. LATIMER, a citizen of the United States of America, residing at Detroit, in the county of Wayne and State of Michigan, have invented certain new and useful Improvements in Apparatus for Hydraulically Storing and Delivering Hydrocarbon Oils, of which the following is a specification, reference being had therein to the accompanying drawings.

The invention relates to apparatus for hydraulically storing and delivering hydrocarbon oils, such for instance as kerosene and gasolene, and it is the particular object of the present invention to avoid all danger of forcing any of the oil into the sewer which receives the waste water.

The invention consists in the novel construction of apparatus as hereinafter set forth and illustrated in the drawing as a diagrammatic vertical section.

A is the storage tank, which is provided with an oil delivery conduit B connected to the upper end thereof and a water conduit C connected to the lower end and controlled by a valve D which alternately connects it to the sewer conduit E and a source of water supply F. There is also preferably provided a summit-head G, which progressively increases the hydrostatic pressure on the water column when connected with the source of supply F up to a predetermined limit. The water conduit C is also preferably provided with a trap portion H which extends below the bottom of the tank A and is designed to prevent the escape of oil into the sewer connection by the overbalancing hydrostatic pressure in the water column. This, while usually effective, occasionally fails, as for instance where the tank is rapidly filled with oil through a suitable fill receptacle I. The inertia of the downwardly moving oil column may be sufficient to temporarily overcome the pressure of the water column so that some of the oil will be forced around the trap H and delivered into the sewer. To avoid such a result I have provided a relief or overflow connection for the oil which is automatically opened upon entrance of the oil into the trap H. As shown, this consists of a casing J arranged in the trap H in the leg thereof adjacent to the tank, which casing contains a float K of a specific gravity between that of the water and the oil. Thus under ordinary circumstances where the water is in the trap, the float will rise to the top of the chamber J and will close a vent port L, but when the chamber J is filled with oil this float will drop and will close connection between the tank and the trap H. The vent L is connected with a riser M which extends upward and is provided with an open discharge N located at a point where it may be observed by the operator and which is below the height of oil column sustained by the hydrostatic pressure of the water in the conduit C when connected to the sewer.

With the construction just described in operation, whenever the oil introduced through the fill receptacle I is more than sufficient to fill the tank it will be forced downward into the chamber J, whereupon the float K will drop away from the port L and will close connection with the trap H. This will permit the double function of checking the downward flow of oil into the trap and also permitting the escape of oil through the overflow connection M, the discharge nozzle N indicating instantly to the operator that the tank is full. Thus all possibility of discharging oil into the sewer is prevented.

What I claim as my invention is:

1. In an apparatus for hydraulically handling oil, the combination with a storage tank, of a water waste conduit connected with said tank, an oil overflow conduit connected with said water waste conduit, a float valve having a specific gravity intermediate that of the water and oil for alternatively closing said water waste and oil overflow conduits, being normally sustained by the water to close the oil overflow.

2. In an apparatus for hydraulically handling oil, the combination with a storage tank, of a water waste conduit connected therewith, an oil overflow conduit connected with said water waste conduit, a chamber in said water waste conduit, a float valve in said chamber of a specific gravity intermediate that of the water and oil and normally sustained by the former to cut-off the oil overflow, said float being adapted when said chamber is filled with oil to drop and close said water waste conduit.

3. In an apparatus for hydraulically handling oil, the combination with a storage tank, of a water waste conduit connected with said tank, an oil overflow connected with said water waste conduit, means normally closing said oil overflow adapted to close the water waste conduit and open the oil overflow when the tank is filled with oil.

4. In an apparatus for hydraulically handling oil, the combination with a tank, of a water waste conduit connected thereto having a downwardly extending oil trap therein, an oil overflow conduit connected with said trap, and a float valve in said trap for alternatively closing said oil overflow and water waste conduits, said float being of a gravity intermediate that of water and oil.

In testimony whereof I affix my signature in presence of two witnesses.

WILLIAM G. LATIMER.

Witnesses:
JAMES P. BARRY,
DELBERT COLLINS.